Feb. 16, 1960 J. W. ANDERSON 2,924,840
MEANS AFFORDING A DETACHABLE CONNECTION
BETWEEN A BLADE UNIT AND A
PRESSURE UNIT THEREFOR
Filed June 21, 1956

INVENTOR.
JOHN W. ANDERSON
BY
Charles S. Penfold
ATTORNEY

United States Patent Office 2,924,840
Patented Feb. 16, 1960

2,924,840

MEANS AFFORDING A DETACHABLE CONNECTION BETWEEN A BLADE UNIT AND A PRESSURE UNIT THEREFOR

John W. Anderson, Gary, Ind.

Application June 21, 1956, Serial No. 592,882

11 Claims. (Cl. 15—245)

This invention relates generally to windshield wipers and more particularly to a wiper which will wipe a curved or flat windshield.

The wiper may be constructed in various ways, but as herein shown comprises a blade assembly or unit and a pressure-distributing device or unit operatively connected to the blade assembly. The blade assembly includes a resilient wiping element and a resiliently flexible support detachably connected to the element. The pressure device preferably includes a pair of secondary yokes having their ends connected to the blade assembly at longitudinally spaced points, a primary yoke or bridge having it sends connected to intermediate portions of the secondary yokes, and a connector carried by the primary yoke for attachment with a wiper arm.

With the foregoing in mind, the principal object of the invention is to provide improved means whereby to facilitate connection of the blade assembly and pressure device during manufacture and replacement of a new blade assembly when required.

The detachable connection embodying the invention is preferably comprised of cooperating components formed on the blade assembly and pressure device as distinguished from separate fittings or fasteners for obtaining the connection. The connection includes providing the support of the blade assembly with a pair of longitudinally spaced abutments for receiving therebetween an end or part of one of the secondary yokes. The organization is preferably such that the resilient wiping element serves to detachably detain a part of a secondary yoke between the abutments, which abutments normally prevent or block connection of the units until the wiping element is compressed to permit passage of the part over one of the abutments. More particularly in this regard, the units are of such a character that they can be readily detachably connected by merely sliding one unit onto the other so that as a part of the pressure unit approaches or engages one of the abutments pressure is applied to the part to compress a portion of the wiping element a sufficient extent to clear the abutment, whereupon the part is moved over and beyond the abutment, after which the pressure applied to the part is released to permit the compressed portion of the element to automatically force the part in a direction to lock it between the abutments. The units can be readily separated by reversing the procedure employed to effect the aforesaid locked connection therebetween.

A specific, but important, objective of the invention is to design and construct one of the abutments in the form of a cam which facilitates the operation of locking the blade and pressure unit as they are being assembled.

Significant features of the invention reside in locating one of the abutments adjacent one end of the support so that only the opposite end of the support can be slid into connection with either extremity of the pressure device, and in locating the other abutment so that the first extremity of the pressure device which is slid onto the said opposite end of the support will eventually have to pass over said other abutment when the secondary yokes of the device are properly mounted on the support.

Another object of the invention is to preferably construct the abutments by offsetting portions of the support, and locating the abutments so they cannot engage and scratch a windshield as the blade assembly is moved thereon.

A particular object of the invention is to provide an organization whereby the pressure device bears against the wiping element in order to assist in reducing noise and vibration between the device and blade assembly.

A further object of the invention is to provide a blade assembly which offers advantages with respect to costs in manufacture and assembly as compared to a wiper in which separate fittings or fasteners are employed to obtain a connection between a blade assembly and a pressure device.

Additional objects and advantages of the invention will become apparent after the description hereinafter set forth in considered in conjunction with the drawings annexed hereto.

Figure 1:
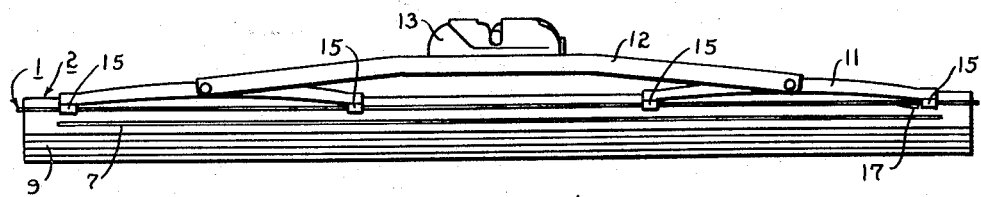
Figure 1 is a side elevational view of a wiper comprising a blade assembly and a pressure device embodying the invention.

As exemplified in Figures 1 through 5 of the drawing, the blade assembly includes a resiliently flexible support generally designated 1 and a resilient wiping element designated 2. The support and wiping element may be attached in various ways, but as illustrated the support is elongate and substantially of uniform thickness and provided with a longitudinal narrow slot 3 terminating short of the ends of the support to provide connecting portions whereby longitudinal parallel portions 4 of the support can be spread apart to enlarge the slot so that the wiping element 2 can be properly located therein, after which the longitudinal portions are released for interlocking connection with the wiping element.

Figure 2:
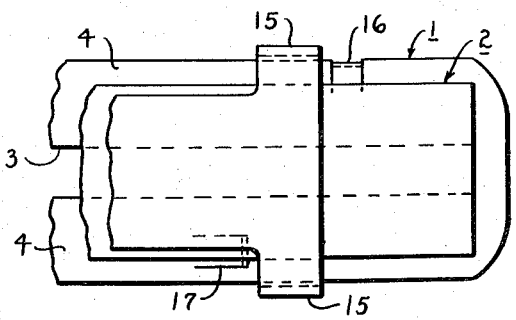
Figure 2 is an enlarged partial top view of the wiper illustrated in Figure 1 showing a part of the pressure device or unit locked between abutments on the blade unit.
Figure 4:
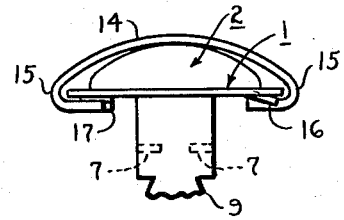
Figure 4 is a partial elevational end view of the blade assembly illustrated in Figure 3.
Figure 3:
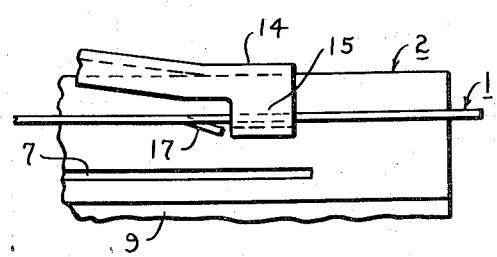
Figure 3 is an enlarged partial side elevational view of the wiper depicted in Figure 2.

The wiping element is preferably formed in one piece and provided with opposed longitudinally extending exterior grooves 5 therein to provide a neck 6. These grooves receive the inner marginal edges of the longitudinal portions 4 with the neck between such portions so that portions of the element engage the upper and lower surfaces of the support as depicted in Figures 2 through 4. It will be noted that the upper portion of the element bearing against the upper side of the support is relatively wide and thick so as to assist in providing a stable connection between the element and support and at the same time afford a setup whereby the upper portion can be compressed, the purpose of which will be described more in detail subsequently. The element is preferably further formed with a second pair of opposed longitudinally extending grooves 7 to provide a hinge 8 to obtain a controlled pivotal movement of a wiping head 9 having wiping edges thereon as shown.

The pressure device may be designed and constructed in various ways, but as disclosed herein is preferably comprised of a plurality of relatively movable members, such as a pair of secondary yokes 10 and 11 having their ends mounted on the support at longitudinally spaced points, a primary yoke 12 having its ends pivoted to intermediate portions of the secondary yokes, and a connector 13 carried by the primary yoke for attachment with a fitting on a wiper arm, not shown.

The secondary yokes are preferably identical in design and construction. Each end of each secondary yoke includes a transverse portion 14 which overlies and normally bears against that portion of the wiper element above the support and a pair of opposed laterally offset parts or ears 15 which are substantially U-shaped in cross section for slidably embracing the exterior longitudinal marginal edges of the support as clearly depicted in Figure 4. The upper portion of the element, among other things, affords a convex or rounded surface on which the ends of the secondary yokes bear to provide a resilient support for the pressure device and at the same time affords a slight rocking movement between the device and blade. This unique arrangement provides a quieter acting wiper as certain metal-to-metal contact points of pressure application prevalent in some wipers now in use are eliminated.

The connection utilized to detachably connect the blade assembly and pressure device may be designed and constructed in various ways, but as exemplified herein, includes a pair of spaced abutments carried by one of the units. More specifically in this regard, the connection preferably includes providing one of the longitudinal portions 4 of the support with a downturned relatively rigid transverse abutment 16 and the other longitudinal portion with an abutment 17 preferably in the form of a downturned longitudinally extending finger or cam member, inclined at an acute angle with reference to the plane of the support so that its free end faces or points generally toward the rigid abutment. The abutments are preferably formed by striking or deforming portions of the support and if found desirable may be otherwise formed and located in positions different from those shown. Attention is directed to the fact that the abutment 17 is located between the longitudinal marginal edges of one of the longitudinal portions of the support; that the abutment 16 is preferably formed transverse to the grain of the material from which the support is made and is, therefore, relatively rigid as against thrust in a direction longitudinally of the blade assembly; and that the abutments are so located that they cannot scratch the windshield when the blade assembly is moved thereon. The abutments are also preferably located adjacent one extremity of the support and longitudinally spaced a predetermined distance apart so as to provide means for receiving or accommodating part of a pressure device, such as an outer eared end or part of either of the secondary yokes, depending on which of these yokes is first slid onto the support.

Figure 5:
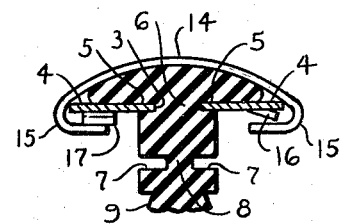
Figure 5 is a partial transverse sectional view of the blade assembly and pressure device, showing an upper portion of the wiping element compressed so that a part of the unit can be passed over one of the abutments.

The mode of connecting and disconnecting the blade assembly and pressure device is preferably accomplished by merely moving the device toward the right, as viewed in Figure 1, so that the left end of the support will successively receive the ears 15 on the secondary yokes 11 and 10 and when the device is moved farther to the right to place the outer end on the yoke 11 adjacent to or in engagement with the abutment 17, pressure is applied to said yoke end to compress the upper portion of the wiping element so that the lower portion of one of the ears 15 will clear the abutment 17 as exemplified in Figure 5, whereupon the part is moved over and beyond the abutment and/or engages the abutment 16, after which the part is released so the compressed portion of the element will automatically urge the part upwardly so that the lower portions thereof are locked between the abutments. Attention is directed to the fact that the abument 17 serves as a cam. This is important and assists in effecting the locking connection between the blade and pressure units. More specifically in this regard, when the pressure unit is being mounted on the blade unit, that part of a secondary which is brought into engagement with the cam will ride thereon and cause such part to gradually move downwardly and compress the upper portion of the wiping element so that after passing over the cam it will automatically snap into a locked position between the abutments. The abutment 16 not only serves as a stop to locate an outer end of one of the secondary yokes with respect to the abutment 17 during connection of the units, but normally prevents an individual from sliding the pressure unit over the right end of the blade assembly. In other words, the organization described primarily affords a locking of the units by introducing only one end of the blade assembly into either end of the pressure device. The units can be readily separated by merely reversing the procedure employed in locking the units together. However, if the occasion requires, separation can be effected by depressing either or both of the abutments.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A windshield wiper comprising a blade unit having a resilient wiping element and a support therefor, and an elongate pressure unit having longitudinally spaced portions mounted on the support, said support being formed with receiving means constituting an integral part thereof, said pressure unit having a part disposed in the receiving means for locking the units together, said element engaging said part for detaining it in said receiving means.

2. A windshield wiper comprising a blade assembly having a resilient wiping element and a support therefor, a pair of abutments provided on the blade assembly, and an elongate pressure device having longitudinally spaced parts mounted on the blade assembly with one disposed between the abutments, said element coacting with said one part for holding same between said abutments, said one part being releasable from said abutments by forcing the part against the element and over one of the abutments while the element and support are assembled.

3. In combination: a windshield wiper blade unit having a wiping element and a support therefor, a pressure unit mounted on the blade unit, and a pair of longitudinally spaced abutments provided on one of the units, the other unit having a part disposed between the abutments for holding the units assembled, said element urging said part toward the support for locking the part between said abutments.

4. In combination: a windshield wiper blade assembly comprising a resilient wiping element and a support therefor, a pressure device mounted on the blade and having a pair of portions with one portion bearing on the wiping element, a first abutment provided adjacent one end of the support serving to prevent initial entry of the end into connection with the pressure device while permitting entry of its other end, and a second abutment provided on the support in spaced relation to the first abutment; said second abutment, said element and said other portion of the pressure device being so constructed and arranged that compression of the element is required before said other portion can be moved over said second abutment for locking between the abutments.

5. A windshield wiper blade assembly comprising a resilient wiping element and a support therefor having abutments located only adjacent opposite sides of the element, and a pressure device having yokes mounted on the blade, one of said yokes having lateral portions disposed adjacent the sides of the support cooperating with the abutments and a bearing portion backed on the element for locking the device on the blade, the arrangement being such that when force is applied to the bearing portion to compress the element the lateral portions can be released from the abutments.

6. A windshield wiper comprising a blade unit having a resilient wiping element and a support therefor, and a pressure member mounted on the support, said blade unit being provided with a pair of longitudinally spaced abutments, said pressure member having a part disposed between said abutments, and said element serving to engage said pressure member and detain said part between said abutments.

7. A windshield wiper comprising a blade unit having a resilient wiping element and a support therefor, and a pressure unit mounted on the blade unit, one of said units being provided with receiving means and the other unit having a part disposed in said receiving means, said element engaging said other unit to detain said parts in said receiving means.

8. A wiper comprising a wiper blade unit and an elongate pressure unit having parts mounted on the blade unit at longitudinally spaced locations, and a pair of longitudinally spaced offset abutments struck from the blade unit for locking a part of the pressure unit therebetween, one of said abutments being provided with with an inclined surface over which the part slides into position between the abutments when the pressure unit is being mounted on the blade unit.

9. A wiper comprising a wiper blade unit having a support provided with a substantially planar portion and an elongate pressure unit having parts mounted on the blade unit at longitudinally spaced locations, and a pair of longitudinally spaced abutments formed integrally on said planar portion of the support for locking a part of the pressure unit therebetween, one of said abutments being disposed transverse to the plane of the planar portion and provided with a surface serving to cam the part thereover into position between the abutments when the pressure unit is being mounted on the blade unit.

10. A wiper comprising a wiper blade unit and a pressure unit, said blade unit comprising a resilient wiping element and a support therefor, said pressure unit comprising a plurality of relatively movable members having parts mounted on the support, an abutment provided on the support for engaging one of the parts to limit movement of the pressure unit in one direction on the blade unit, and means on the blade unit for causing said part to engage and compress an upper portion of the wiping element when the pressure unit is being mounted on the blade unit to locate the part adjacent the abutment.

11. A wiper comprising a wiper blade unit and a pressure unit, said blade unit comprising a resilient wiping element and an elongate continuous flexible support therefor, a pressure device mounted on the wiping element and having parts cooperating with the support, and a pair of abutments formed integrally on the support with one of the parts disposed therebetween for locking the units together, the cross-sectional dimensions of said part, wiping element and support being such that compression of a portion of the element is required when the part is moved either into a locking position between the abutments or apart therefrom.

References Cited in the file of this patent
UNITED STATES PATENTS

| | | |
|---|---|---|
| 2,687,544 | Scinta | Aug. 31, 1954 |
| 2,700,785 | Oishei et al. | Feb. 1, 1955 |
| 2,721,350 | Oishei | Oct. 25, 1955 |
| 2,782,443 | Krohm | Feb. 26, 1957 |
| 2,782,448 | Anderson | Feb. 26, 1957 |
| 2,782,449 | Anderson | Feb. 26, 1957 |

UNITED STATES PATENT OFFICE

CERTIFICATE OF CORRECTION

February 16, 1960

Patent No. 2,924,840

John W. Anderson

It is hereby certified that error appears in the printed specification of the above numbered patent requiring correction and that the said Letters Patent should read as corrected below.

Column 1, line 27, for "it sends" read -- its ends --; column 2, line 37, before "unit" insert -- pressure --.

Signed and sealed this 26th day of July 1960.

(SEAL)
Attest:

KARL H. AXLINE
Attesting Officer

ROBERT C. WATSON
Commissioner of Patents